United States Patent
Sablin et al.

(10) Patent No.: US 10,165,024 B2
(45) Date of Patent: Dec. 25, 2018

(54) MULTIPLEXING DATA

(71) Applicant: Microsoft Technology Licensing, LLC, Redmond, WA (US)

(72) Inventors: Sergey Sablin, Redmond, WA (US); Sergei Nikiforov, Stockholm (SE); Matthieu Michel Jean-Alexis Moinard, Stockholm (SE); Victor Miguel Barbero, Madrid (ES); David Yuheng Zhao, Enebyberg (SE); Mattias D. Nilsson, Sundbyberg (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 277 days.

(21) Appl. No.: 15/143,136

(22) Filed: Apr. 29, 2016

(65) Prior Publication Data
US 2017/0126758 A1    May 4, 2017

(30) Foreign Application Priority Data

Oct. 28, 2015 (GB) .................... 1519090.3
Nov. 12, 2015 (GB) .................... 1519994.6

(51) Int. Cl.
| | |
|---|---|
| *G06F 15/16* | (2006.01) |
| *H04L 29/06* | (2006.01) |
| *H04L 5/22* | (2006.01) |
| *H04L 12/26* | (2006.01) |
| *H04L 12/805* | (2013.01) |
| *H04L 12/853* | (2013.01) |
| *H04N 21/2368* | (2011.01) |
| *H04N 21/24* | (2011.01) |
| *H04W 72/12* | (2009.01) |
| *H04L 12/815* | (2013.01) |
| *H04L 12/825* | (2013.01) |

(52) U.S. Cl.
CPC ......... *H04L 65/4069* (2013.01); *H04L 5/22* (2013.01); *H04L 43/0882* (2013.01); *H04L 47/22* (2013.01); *H04L 47/2416* (2013.01); *H04L 47/25* (2013.01); *H04L 47/36* (2013.01); *H04L 47/365* (2013.01); *H04L 65/00* (2013.01); *H04L 65/602* (2013.01); *H04L 65/80* (2013.01); *H04N 21/2368* (2013.01); *H04N 21/2402* (2013.01); *H04W 72/12* (2013.01)

(58) Field of Classification Search
None
See application file for complete search history.

(56) References Cited

U.S. PATENT DOCUMENTS

| | | | |
|---|---|---|---|
| 7,652,994 B2 | 1/2010 | Van Beek | |
| 2005/0259690 A1 | 11/2005 | Garudadri et al. | |
| 2007/0071030 A1* | 3/2007 | Lee | H04L 1/0007 370/468 |
| 2008/0095053 A1* | 4/2008 | Chen | H04L 47/10 370/230.1 |
| 2015/0110134 A1* | 4/2015 | Kozica | H04N 21/44004 370/516 |
| 2017/0093950 A1* | 3/2017 | Trani | H04L 65/608 |

OTHER PUBLICATIONS

"International Search Report and Written Opinion", Application No. PCT/US2016/058112, dated Jan. 3, 2017, 11 pages.
"International Preliminary Report on Patentability Issued in PCT Application No. PCT/US2016/058112", dated Dec. 6, 2017, 7 Pages.
"Second Written Opinion Issued in PCT Application No. PCT/US2016/058112", dated Sep. 12, 2017, 6 Pages.

* cited by examiner

*Primary Examiner* — Brian Whipple
(74) *Attorney, Agent, or Firm* — Schwegman Lundberg & Woessner, P.A.

(57) ABSTRACT

Multiple data streams are transmitted from a transmitting device via an end-to-end or process-to-process channel to a receiving device. At the transmitting device a media data stream is generated. A maximum packet size for another data stream is determined based on a determined end-to-end or process-to-process bandwidth and using playout information pertaining to the media data, which conveys a desired playout rate of the media data. At the transmitting device, based on the determined maximum packet size, a plurality of data packets of the other data stream is generated, each having a packet size no more than the determined maximum. The media and other data streams are multiplexed onto the channel at the transmitting device, thereby transmitting both of the data streams from the transmitting device to the receiving device via the same channel.

20 Claims, 5 Drawing Sheets

MULTIPLEXING DATA

RELATED APPLICATIONS

This application is a continuation of and claims priority under one or more of 35 USC § 119 or § 365 to Great Britain Patent Application No. 1519994.6, filed Nov. 12, 2015, which is a continuation of and claims priority to Great Britain Patent Application No. 1519090.3, filed Oct. 28, 2015, the disclosures of which are incorporated in their entirety by reference herein.

BACKGROUND

Communication systems allow users to communicate with each other over a communication network e.g. by conducting a communication event over the network. The network may be, for example, the Internet or public switched telephone network (PSTN). During a call, audio and/or video signals can be transmitted between nodes of the network, thereby allowing users to transmit and receive audio data (such as speech) and/or video data (such as webcam video) to each other in a communication session over the communication network.

Such communication systems include Voice or Video over Internet protocol (VoIP) systems. To use a VoIP system, a user installs and executes client software on a user device. The client software sets up VoIP connections as well as providing other functions such as registration and user authentication. In addition to voice communication, the client may also set up connections for communication events, for instant messaging ("IM"), screen sharing, or whiteboard sessions.

Data of the communication event may be encapsulated in a data stream. That is, a stream of data packets, which can be transmitted as they are generated e.g. in real time, such that there is only a short delay (e.g. about two seconds or less) between data of the stream being generated at a transmitting device and received at a receiving device. In other words, earlier generated data packets of the stream can be transmitted before later generated data packets of the stream have been generated. Different types of data may be embodied in different, separate streams, for example audio data may be embodied in an audio data stream (that is, encapsulated in audio data packets of the audio stream), separate and different from a video data stream embodying video data (that is, encapsulated in video data packets of the video stream). In a call, additional streams may also be generated at the transmitting device, such as a control data stream; and/or additional video data stream(s) e.g. there may be a call video data stream for call video captured using a camera(s) of the transiting device, a screen sharing video data stream for screen sharing video data, a whiteboard video data stream for whiteboard video data etc. A data stream may, for example, be identified by a stream identifier, e.g. included in the headers of the data packets of that stream; and/or they separate data streams may be distinguished from one another in the way they are generated and managed at the transmitting device. In order to transmit multiple streams to the receiving device simultaneously, they may be multiplexed onto a channel of the network between the transmitting device and the receiving device, for example using time division multiplexing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various aspects of the present subject matter pertain to the transmission of multiple data streams from a transmitting device via a network to a receiving device. The streams are transmitted via an end-to-end channel between the transmitting device and the receiving device at a transport layer of the network layers or a process-to-process channel between the transmitting device and the receiving device at an application layer of the network layers (the streams are transmitted via the same channel).

At the transmitting device a media data stream is generated, which comprises audio or video data to be played out at the receiving device at a desired playout rate. An end-to-end bandwidth of the end-to-end channel or a process-to-process bandwidth of the process-to-process channel that is available for the media stream and another data stream is determined. A maximum packet size for another data stream is determined based on the determined available bandwidth and using playout information pertaining to the audio or video data of the media data stream, which conveys the desired playout rate of the audio or video data. At the transmitting device, based on the determined maximum packet size, a plurality of data packets of the other data stream is generated, each having a packet size no more than the determined maximum. The media and other data streams are multiplexed onto the end-to-end or process-to-process channel at the transmitting device, thereby transmitting both of the data streams from the transmitting device to the receiving device via the same channel.

BRIEF DESCRIPTION OF FIGURES

For a better understanding of the present subject matter, and to show how embodiments of the same may be carried into effect, reference is made to the following figures, in which.

DETAILED DESCRIPTION OF EMBODIMENTS

Figure 1:
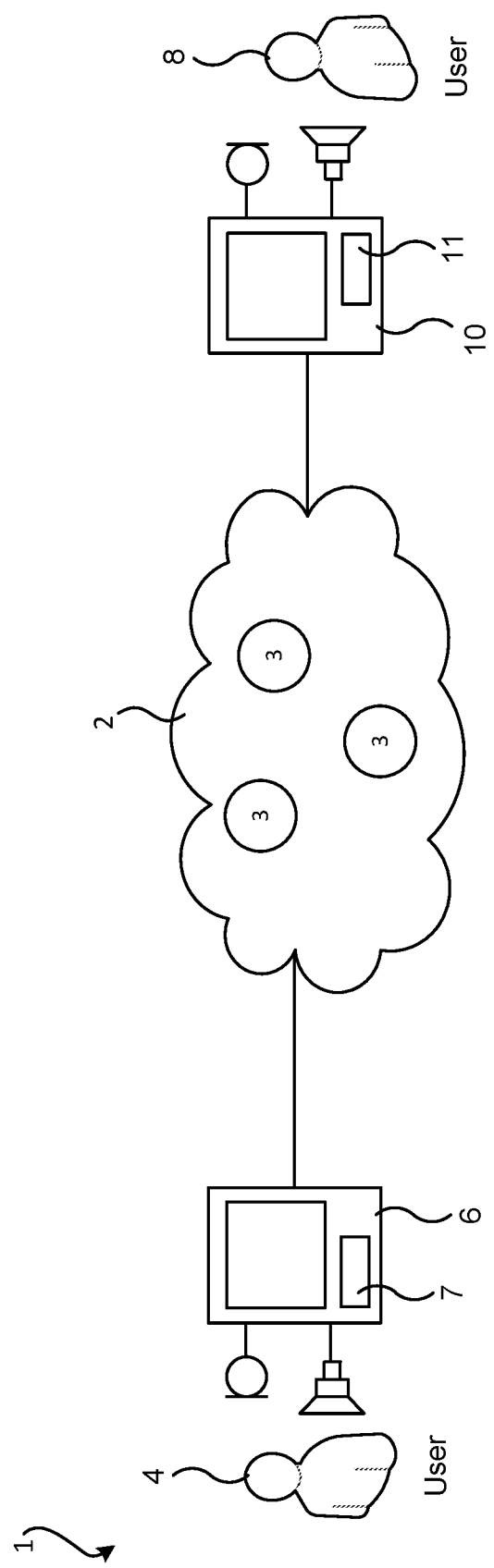
FIG. 1 shows a block diagram of a communication system.

The present subject matter relates to a situation, in which a media data stream—that is a data stream comprising audio or video data ("media data")—is multiplexed onto the same channel (end-to-end, i.e. transport layer, or process-to-process, i.e. application layer, channel) as at least one other data stream (which may be another media data stream, or some other type of data stream). That is, in which the media stream and the other stream share an available bandwidth (BW) of the channel e.g. the total bandwidth of the channel, or a portion of the total bandwidth allocated to them.

The maximum packet size for the other data stream is determined based on both frame information conveying a playout rate (e.g. a frame rate R) of the audio or video data and a determination of the available bandwidth BW, which is an end-to-end or process-to-process bandwidth estimation, in order to prevent the other data stream causing "jitter" in the media stream (see below).

The concepts of "end-to-end" and "process-to-process" communications are well known in context of networked systems, particularly (though not exclusively) in the context of communications over the public Internet and more generally in the context of the TCP/IP Protocol Suite.

The use of an end-to-end or process-to-process bandwidth estimation means that the video packet size is adapted taking into account the full communications path between the transmitting device and the receiving device.

The process-to-process or end-to-end bandwidth may be limited by a bottleneck anywhere in the communications path between the transmitting device and the receiving device. For example, the end-to-end or process-to-process channel may be established via multiple lower layer channels, such as network layer (corresponding to layer 3 of the OSI model) or link layer (e.g. MAC layer, i.e. layer 2 of the OSI model, or physical layer, i.e. OSI layer 1) channels E.g. one or more lower layer channels between the transmitting device and an intermediate node, such as a router, switch or cellular base station, plus one or more lower layer channels between the intermedia node, any other intermediate nodes, and the receiving device. In this case, a bottleneck may, for example, occur in the part of the communications path between the transmitting device and, say, the cellular base station, but equally it may occur in the part of the communications path between the cellular base station and the receiving device (for example, elsewhere in the cellular network, within the Internet or other packet based network, or within a network local to the receiving device, such as a home or business local area network, or the receiving device's own cellular network where applicable). Using an end-to-end or process-to-process bandwidth estimation means that a bottleneck can be accounted for by reducing the maximum media packet size irrespective of where that bottleneck occurs in the communications path.

The video data may for example be a series of video frames (i.e. images) to be played out by displaying them in quick succession at the playout rate R, referred to as the frame rate in this context, such that each frame is displayed for a duration 1/R before the next frame is displayed. The audio data may also be in the form of a series of audio frames to be played out at the playout rate (the frame rate), or a series of individual audio data samples to be played out at the playout rate (the sample rate). An audio frame is a set of multiple audio data samples to be played out over an intended duration that is the inverse of the frame rate, i.e. 1/R where R is the frame rate. For example, sometimes audio data is divided into frames in order to apply audio compression on a per-frame basis.

Hereinbelow, the description is phrased in terms of media frames and their frame rate, however as will be appreciated all description pertaining to the frame rate applied generally to other types of playout rate, e.g. the sample rate of individual audio samples where applicable (e.g. it is not always necessary to divide the audio data into frames).

The present disclosure recognizes that data packets of the other data stream can cause "jitter" in the media frames when they are played-out at the receiving device. Jitter is an effect which arises when the last-received media frame has been played out in full at the receiving device—that is played out over its intended duration (1/R) for an audio frame, and displayed for its intended duration (1/R) for a video frame—before the next media frame to be played out has been received. This in turn can cause, for example, perceptible breaks in the audio or perceptible a freezing or slowing down of the video, which can reduce the perceptual quality of audio/video as it is played out at the receiving device.

Figure 5:
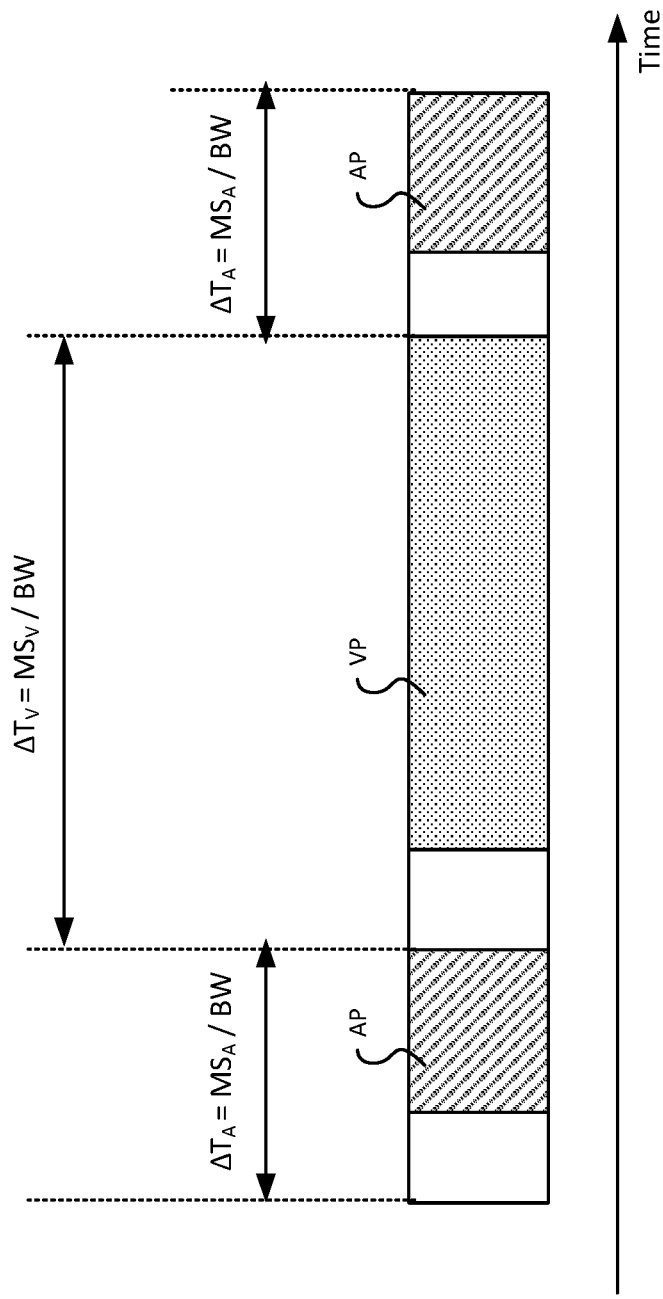
FIG. 5 shows multiplexed audio and video data streams.

To aid illustration, the following example is considered. Say, for example, a data packet(s) of the other data stream is transmitted in between (in time) two data media data packets, i.e. audio or video data packets, of the media stream, containing adjacent media frames in the sequence of frames to be played out. An example is shown in FIG. 5, which shows a video data packet VP of the other data stream (which is a video stream in this example) being transmitted in between two audio data packets AP of the media stream (which is an audio stream in this example).

The other data packet(s) can cause jitter in the adjacent frames if:

$$\Delta T_O > 1/R \quad (1)$$

where $T_O$ is the worst-case time it takes to transmit the other data packet(s) in full via the channel. That is, if the time taken to transmit the other data packet(s) exceeds the intended duration (1/R) of the last-received media frame.

Equation (1) assumes that the playout of the next media frame can commence as soon as the first part of it has been received, before it has been received in full. In the case that the next media frame needs to be received in full before its play out can commence, then jitter can occur if:

$$\Delta T_O + \Delta T_M > 1/R \quad (2)$$

where $\Delta T_M$ is the worst-case time it takes to transmit the next media frame, contained in one or more media data packets of the media stream, in full via the channel. That is, if the time taken to transmit the other data packet(s) and the next media frame exceeds the intended duration (1/R) of the last-received media frame.

Note $\Delta T_O = \Delta T_V$ and $\Delta T_M = \Delta T_A$ in the example of FIG. 5.

These are just two examples: precisely when the other data packet(s) will cause jitter is circumstance-dependent, as will be apparent. Nevertheless, the present disclosure recognises that whatever the individual circumstance, whether or not the other data stream causes jitter will depend at least to some extent on the size of the data packets in the other stream in relation to the desired playout rate of the media data in the media stream.

Accordingly, the present subject matter addresses this issue of jitter by limiting the size of the other data packet(s) based on the frame information conveying the desired frame rate R, such that the maximum packet size for the other data stream has a dependence on the frame rate R of the frames in the (separate and different) media stream. The frame information may, for example, comprise the desired frame rate R or the intended frame duration (1/R), or convey the frame rate R in some other way.

The worst-case transmission times $\Delta T_O$ and $\Delta T_M$ are given by $$\Delta T_O = MS_O / BW \quad (3)$$

$$\Delta T_M = MS_M / BW \quad (4)$$

Where $MS_O$ is the maximum size of the other data packet(s) and $MS_M$ is the maximum size of the media packet(s), e.g. in bits, bytes, kilobits, kilobytes etc.; BW is the available bandwidth, e.g. in bits per second, bytes per second, kilobits per second, kilobytes per second etc. That is, the relevant packet size divided by the available channel bandwidth BW.

As indicated above, the available bandwidth BW is the end-to-end or process-to-process bandwidth of the whole communications path from the transmitting device to the receiving device, as this is what determines how long it takes for each media data packet to reach the receiving device in full.

Embodiments of the subject matter are described in detail below. First a context in which embodiments of the subject matter can be usefully applied will be described.

FIG. 1 shows a block diagram of a communication system 1. The communication system 1 comprises a communications network 2, to which is connected a first user device 6 and a second user device 10. The network 2 is a packet-based internetwork (internet) in this example, such as the Internet (capital I), and as such comprises a plurality of routers 3 which route data between individual networks of the internet 2. However, the network 2 can be another type of network such as a cellular network or PSTN. Where the user devices 6, 10 are mobile devices, they may for example connect to the Internet via cellular network(s).

The user devices 6, 10 are available to first and second users 4, 8 respectively. Each user device 6, 10 is shown to be executing a respective communication client 7, 10.

Each client 7, 10 is for effecting communication events within the communication system 1 via the network 2, such as audio and/or video calls, and/or other communication event(s) such as a whiteboard, instant messaging or screen sharing session, between the user 4 and the other user 8. The communication system 1 may be based on voice or video over internet protocols (VoIP) systems. These systems can be beneficial to the user as they are often of significantly lower cost than conventional fixed line or mobile cellular networks, particularly for long-distance communication. The client software 7, 10 sets up the VoIP connections as well as providing other functions such as registration and user authentication e.g. based on login credentials such as a username and associated password.

To effect a communication event, data is captured from each of the users at their respective device and transmitted to the other user's device for outputting to the other user. For example, in a video call, audio data is captured via a microphone of the respective device containing that user's speech (call audio), and transmitted as in audio data stream via the network; video data is captured via a camera of the respective device embodying a moving image of that user (call video), and transmitted in a video stream via the network 2. The call audio/video is captured and encoded at the transmitting device before transmission, and decoded and outputted at the other device upon receipt. The users 4, 8 can thus communicate with one another via the communications network 2 audibly and visually.

A communication event may be real-time in the sense that there is at most a short delay, for instance about 2 seconds or less, between data (e.g. call audio/video) being captured from one of the users at their device and the captured data being outputted to the other user at their device.

Only two users 4, 8 of the communication system 1 are shown in FIG. 1, but as will be readily appreciated there may be many more users of the communication system 1, each of whom operates their own device(s) and client(s) to enable them to communicate with other users via the communication network 2. For example, group communication events, such as group calls (e.g. video conferences), may be conducted between three or more users of the communication system 1.

Figure 2:
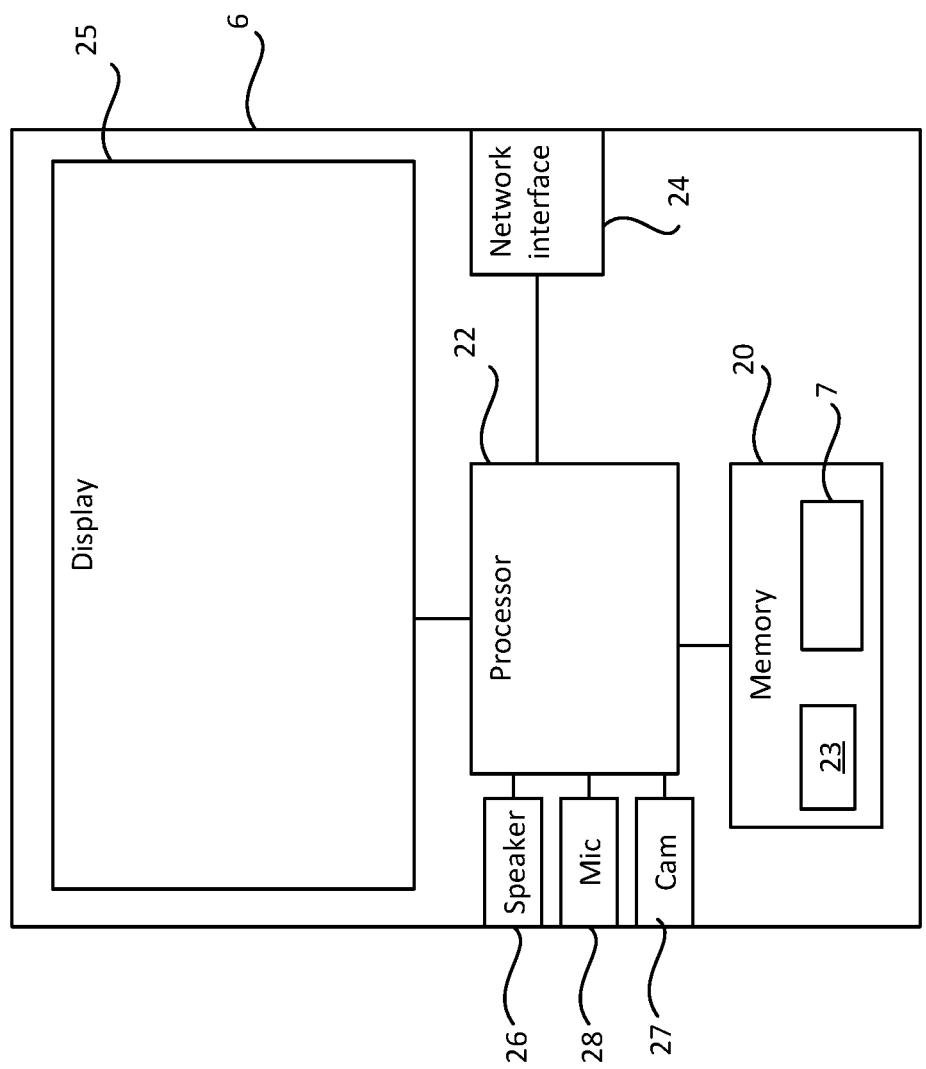
FIG. 2 shows a block diagram of a transmitting device, which is a user device.

FIG. 2 shows a block diagram of the user device 6. The user device 6 is a computer device which can take a number of forms e.g. that of a desktop or laptop computer device, mobile phone (e.g. smartphone), tablet computing device, wearable computing device (headset, smartwatch etc.), television (e.g. smart TV) or other wall-mounted device (e.g. a video conferencing device), set-top box, gaming console etc. The user device 6 comprises a processor 22, formed one or more processing units (e.g. CPUs, GPUs, bespoke processing units etc.) and the following components, which are connected to the processor 22: memory 20, formed on one or more memory units (e.g. RAM units, direct-access memory units etc.); a network interface(s) 24; at least one input device, e.g. a camera 27 and a microphone(s) 28 as shown; at least one output device, e.g. a loudspeaker (26) and a display(s) 25. The user device 6 connects to the network 2 via its network interface 24, so that the processor 22 can transmit and receive data to/from the network 2. The network interface 24 may be a wired interface (e.g. Ethernet, FireWire, Thunderbolt, USB etc.) or wireless interface (e.g. Wi-Fi, Bluetooth, NFC etc.). The memory holds the code of the communication client 7 for execution on the processor 22. The client 7 may be e.g. a stand-alone communication client application, plugin to another application such as a Web browser etc. that is run on the processor in an execution environment provided by the other application. The client 7 has a user interface (UI) for receiving information from and outputting information to the user 4. For example the client 7 can output decoded call audio/video via the loudspeaker 26 and display 25 respectively. The display 25 may comprise a touchscreen so that it also functions as an input device. The client captures audio/video via the microphone 28 and camera 27 respectively, which it encodes and transmits to one or more other user devices of other user(s) participating in a call. Any of these components may be integrated in the user device 6, or external components connected to the user device 6 via a suitable external interface.

Figure 3:
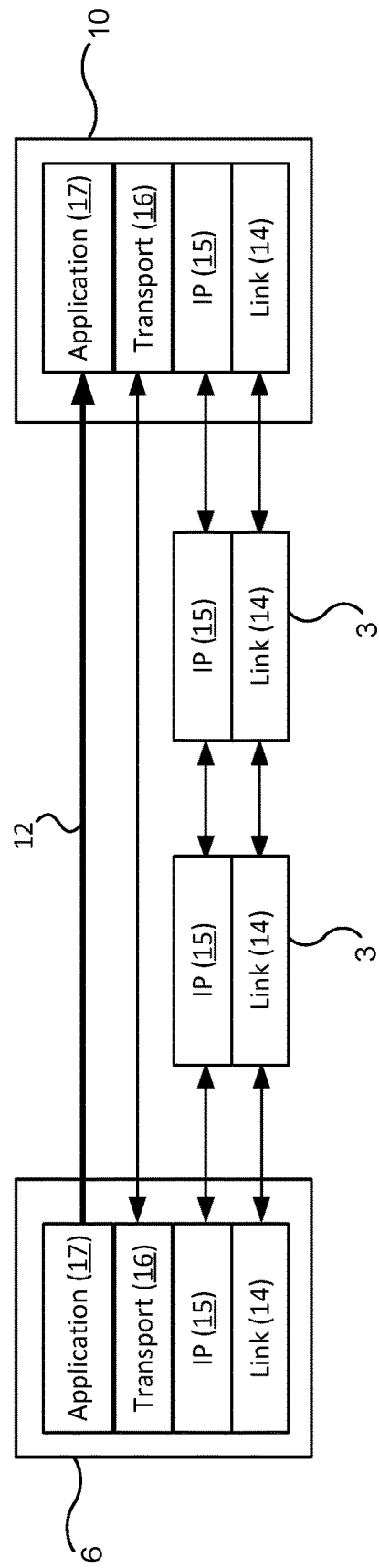
FIG. 3 shows an application layer channel from a transmitting device via a network to a receiving device.

FIG. 3 shows how a channel 12 may be established between the user devices 6, 10 via the network 2. The network 2 has a plurality of network layers, namely a link layer 14 (lowest layer), a network layer 15 above the link layer 14, a transport layer 16 above the network layer 15, and an application layer 17 above the transport layer 16. The network layers may for example be in accordance with the TCP/IP suite. The application layer 17 provides process-to-process communication between processes running on different hosts i.e. general purpose computer devices connected to the network 2 such as user devices 6, 8. The transport layer 16 provides end-to-end communication between different hosts, including providing end-to-end connections(s) between hosts for use by the processes. The internet layer 15 provides routing i.e. communication between different individual networks of the internet 2, via the routers 3. The link layer 14 provides communication between physical network addresses—for instance, MAC ("Medium Access Control") addresses—of adjacent nodes in same individual network the internet 2 e.g. via network switches and/or hubs etc. which operate at the link layer 14.

In this example, the channel 12 is an application-layer channel at the application layer 17 of the network 2, established between instances of the clients 7, 11 that are running on the user devices 6, 10 respectively. That is, a process-to-process channel between the client instances on the two user devices 6, 10.

The application-layer channel 12 may, in turn, be established via one or more transport layer channels between the devices 6, 10, often referred to as end-to-end or host-to-host channel(s). Each transport layer channel is, in turn, is established via network layer channel(s) between one of user devices 6, 10 and a router 3, or between pairs of routers 3, which in turn are established via link layer channels within the individual networks of the internet 2.

The embodiments of the present subject matter described below are applied to the application-layer channel 12. However, in general the subject matter can be applied at any network layer (e.g. to a transport layer channel).

The channel 12 is a unidirectional channel in this example, from the client instance on the first user device 6 to the client instance on the second user device 17. Alternatively, the channel 12 may be bidirectional, for example with a respective (fixed or variable) portion of its total bandwidth allocated for communication in each direction.

The described embodiments are applied at the first user device 6 to effect data transmission from the first user device 6 to the second user device 10. As will be apparent, embodiments can equally be applied at the other user device 10 to effect transmission in the other direction in the same call.

Figure 4:
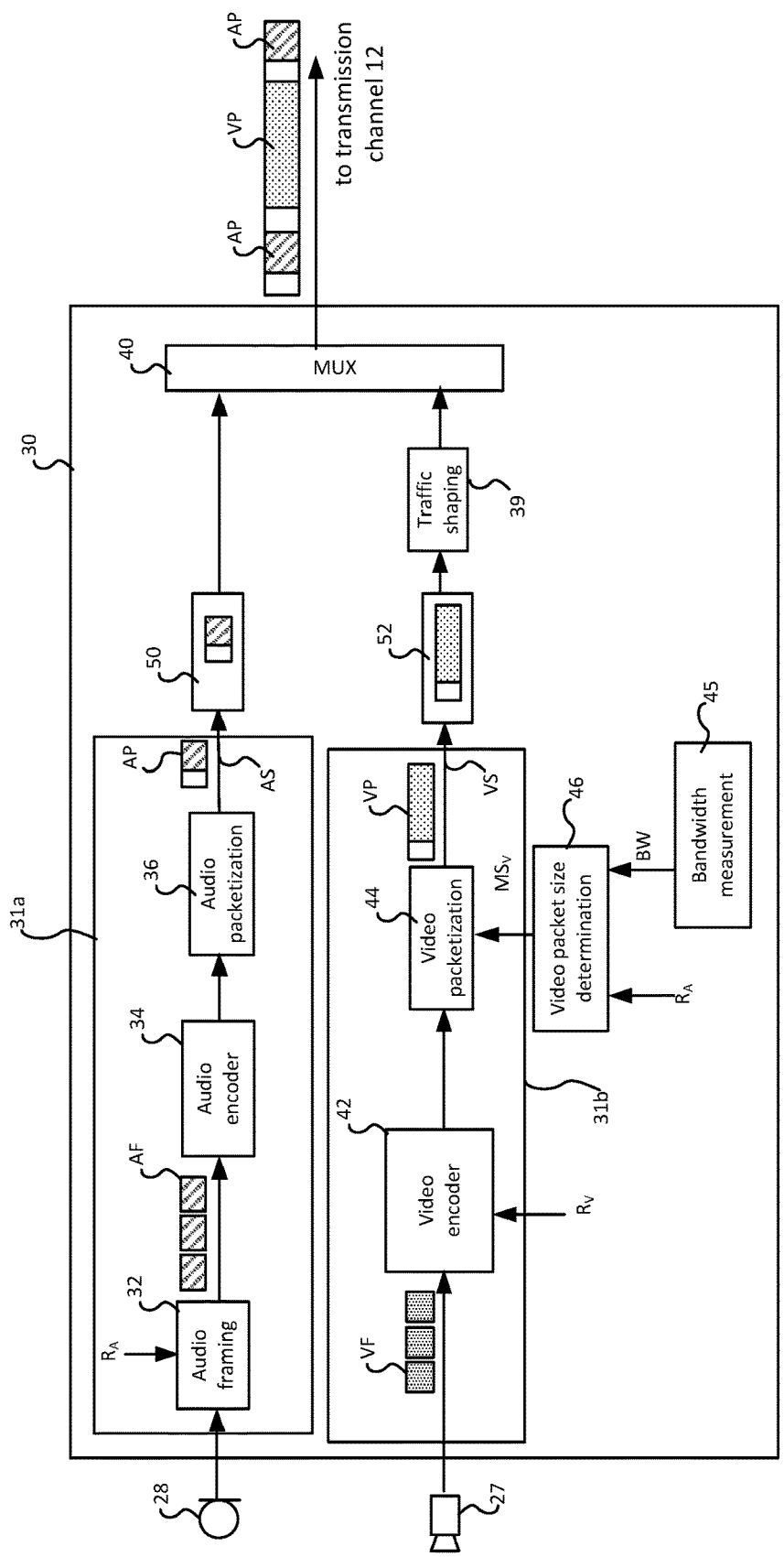
FIG. 4 shows functional modules of a transmitting device.

FIG. 4 shows a media data transmission system 30 of the transmitting device 6. Various functional modules 32-46 of the media data transmission system 30 are shown, which are software modules of the client 7. That is, each of the functional modules 32-46 represents functionality implemented by executing respective code of the client 7 on the processor 22 of the transmitting device 6. The functional modules comprise: an audio framing module 32, an audio encoder 34, an audio packetization module 36, which constitute an audio data packetization system 31a of the media data transmission system 30; a traffic shaping module 39, a bandwidth measurement module 45 and a multiplexor 40; a video encoder 42, and a video packetization module 44, which constitute a video data processing system 31b of the media data processing system 30; and a video packet size determination module 46. Audio and video data buffers 50, 52 are also shown, which are implemented in the memory 20, and which may for example be first-in-first-out buffers.

The audio packetization system 31a packetizes audio data captured by the microphone 28 in real-time for transmission to the receiving device 10 via the channel 12, during a call between the users 4, 8.

The audio framing module 32 receives audio data samples captured by the microphone 26, and uses the received audio samples to generate a sequence of audio frames AF. Each audio frame AF is a set of contiguous audio samples captured by the microphone. The number of samples in each frame is configurable in the example, based on electronically stored frame information 23 in the memory 20 (see FIG. 2). The frame information 23 conveys a desired frame rate $R_A$ for the audio frames, and may for example be a framing parameter(s), specifying the frame rate $R_A$, e.g. in frames per second, or a desired audio frame duration ($1/R_A$), e.g. in ms or audio samples. Typical frame durations ($1/R_A$) are 20 ms, 40 ms, 60 ms, 80 ms, or 100 ms, and may be audio-codec dependent. The frame rate $R_A$ is the rate at which frames are intended to be played out at the receiving device 10, which should match the rate at which they are generated in real time.

The audio encoder 34 applies audio compression to the frames AF on a per-frame basis, to reduce the size (in bits) of each frame AF for transmission.

The audio encoder 34 and audio framing module 32 may for example constitute an audio codec of the client 7.

The audio packetization module 36 encapsulates the encoded audio frames AF into audio data packets AP in real-time, which are application-layer packets in this example, so as to generate an audio data stream AS. That is, the audio data packets AP are data packets of the audio stream AS.

Each audio data packet AP has a header, comprising relevant metadata such as a stream identifier identifying the audio stream AS, and a payload comprising audio data of the audio frames AF. In this example, each audio packet payload comprises one (and only one) whole audio frame AF, such that there is a direct one-to-one correspondence between audio frames AF and audio data packets AP. However, as will be apparent audio frames AF can be organized into packets in various other ways.

Once an audio data packet AP of the audio stream AS has been generated, it is stored in the audio data buffer 50 for transmission via the channel 12.

The video packetization system 31b packetizes video data (image data) captured by the camera 27 in real-time for transmission to the receiving device 10 via the channel 12, during the call between the users 4, 8.

The video encoder 42 (e.g. video codec) receives video frames from the camera 27, at a video frame rate $R_V$ e.g. 15-20 fps (frames per seconds), or higher e.g. 20-30 fps or even up to 60 fps for high quality video. That is, $R_V$ video frames VF are captured each second. Each video frame VF is an image to be displayed at the receiving device. The images are intended to be displayed in quick succession at the receiving device, at the same frame rate $R_V$ at which they are captured so as to accurately replicate movement captured by the camera 27. The video encoder 42 applies video compression to the received frames VF, to reduce their size (in bits). This may involve, for example, image quantization, whereby ranges of pixel values are mapped to single values; reducing the pixel resolution of the frames, i.e. reducing the number of pixels in each frame; intra-encoding, whereby pixel values in the encoded frames are expressed relative to other pixels in the same frame; inter-encoding, whereby pixel values in each frame are expressed relative to pixels in the same or other frames etc.

The video packetization module 44 encapsulates the encoded video frames VF into video data packets VP of a video data stream VS. Each video data packet VP has a header comprising relevant metadata, such as an identifier of the video stream VS that distinguishes it from the audio stream AS, and a payload which comprises encoded video data of the encoded frames. In this example, the video data packets VP, and in particular their payloads, have variable sizes. In particular, the maximum size $MS_V$ of each video data packet VP is determined dynamically by the video packet size determination module 46, as will described in due course. Accordingly, each video data packet VP can comprise only some encoded video data of a single encoded frame, a whole encoded frame, encoded video data of multiple encoded frames etc. depending on how the maximum packet size $MS_V$ is currently set.

Once a video packet VP of the video stream VS has been generated, it is stored in the video data buffer 52 for transmission to the receiving device 10 via the channel 12.

The audio and video packets VP, AP may for example have headers of fixed respective sizes. The video packets VP at least may have payloads of variable sizes, which can be varied in accordance with the maximum packet size $MS_V$.

The multiplexor 40 multiplexes the audio and video streams AS, VS onto the channel 12 (i.e. the same channel), using time division multiplexing. That is, audio and video data packets AP, VP are selectively retrieved in turn from the buffers 50, 52 respectively, and transmitted via the channel one-after-the other.

The audio and video data packets AP, VP are dedicated audio and video data packets respectively i.e. each of the packets packet comprises only one of audio and video data;

that is, audio and video data is not mixed in the same packet. Both the audio data packets AP and the video data packets VP are generated sequentially, i.e. audio packets are generated one after the other, as are video data packets. The generation of the video data packets VP is concurrent with the generation of the audio data packets AP; that is, the audio and video data packets AP, VP are generated in parallel to one another.

The audio and data packets AP, VP are multiplexed by the multiplexor 40 into the stream as they are generated. The multiplexing is such that any two adjacent audio packets AP are separated from one another by at most one video data packet VP in this example, which is effected by the traffic shaping module 39.

The bandwidth measurement module 45 determines an available bandwidth BW of the channel 12. That is, the bandwidth BW that is available for the audio and data streams AS, VS, which may be the total bandwidth of the channel BW or only a portion of the total, e.g. a portion which has been allocated to be shared by the streams AS, VS. In this example, the determined bandwidth BW is a determined process-to-process bandwidth of the application layer channel 12 (but could alternatively be, say, a determined end-to-end bandwidth of a transport layer channel).

By reducing the maximum video packet size $MS_V$ at low bandwidths, the audio packet jitter can be reduced and thus audio quality can be improved for audio-video calls. That is, audio packet jitter induced by the transmission of a video packet VP can be reduced or eliminated.

Accordingly, the packet size determination module 46 controls the maximum video packet size $MS_V$ as a function of (i) the frame rate $R_A$ of the audio stream AS and (ii) available bandwidth (BW) of the channel 12.

By reducing the maximum video packet size $MS_V$ as the bandwidth decreases, for a current audio frame rate $R_A$, audio jitter can be prevented or at least reduced.

In other words, the maximum video packet size $MS_V$ is dynamically adapted based on the channel capacity and audio frame rate $R_A$.

Audio packets AP created at the sender side are directly put onto the wire (that is, multiplexed onto the channel 12 directly), roughly every 20 ms for an audio frame rate $R_A$ of 50 fps, whereas video packets VP are paced through the traffic shaper module 39, so as to avoid sending excessively large bursts of video data between audio packets. The pacing granularity is limited to one video packet and thus the maximum instantaneous delay $\Delta T_V$ introduced by pacing one video packet between audio packets equals the maximum video packet size $MS_V$ divided by the available channel bandwidth BW. That is:

$$\Delta T_V = MS_V/BW$$

as illustrated in FIG. 5.

As an example, for a maximum video packet size of, say, 1152 bytes (1200 bytes with headers) and an available channel bandwidth of 100 kbps this, corresponds to $\Delta T_V = 100$ ms (1200 bytes/12.5 bytes per second) of transmission time. This can result in significant audio jitter increase when inserted between audio packets that are intended to be spaced apart by only by 20 ms.

To prevent the video data packets $MS_V$ creating audio packet jitter, in some cases the maximum video packet size $MS_V$ may be set such that:

$$MS_V = BW/R_A \text{ (or, more generally, } MS_V \leq BW/R_A\text{)}$$

That is, as no more than (e.g. substantially equal to) the available channel bandwidth BW divided by the audio frame rate $R_A$. This prevents the conditions of equation (1) above from arising.

In other cases, the maximum video packet size $MS_V$ may be set such that:

$$MS_V = (BW/R_A) - MS_A \text{ (or, more generally, } MS_V \leq (BW/R_A) - MS_A\text{)}$$

where $MS_A$ is the size (or maximum size) of the audio packets AP, such that the time it takes to transmit one audio packet AP is:

$$\Delta T_A = MS_A/BW$$

as also illustrated in FIG. 5. This prevents the conditions of equation (2) above from arising.

Making the video packets as large as possible—that is as large as they can be without causing audio jitter—makes most efficient use of the available bandwidth BW, as this means as small a portion of the bandwidth BW as possible is used on packet header data.

The maximum video packet size $MS_V$ may be upper and lower limited, such that:

$$MS_V = \begin{cases} MS_{max} & \text{if } f(BW, R_A) \geq MS_{max} \\ f(BW, R_A) & \text{if } MS_{min} \leq f(BW, R_A) \leq MS_{max} \\ MS_{min} & \text{if } f(BW, R_A) \leq MS_{min} \end{cases}$$

where $$f(BW, R_A) = \frac{BW}{R_A} \text{ or } f(BW, R_A) = \frac{BW}{R_A} - MS_A$$

for example. That is $MS_V$ may be a function of the audio frame rate $R_A$ and (in some cases) the available bandwidth BW, that is lower limited by a first predetermined value $MS_{min}$ and upper limited by a second predetermined value $MS_{max}$.

For example, $MS_{min} = 256$ bytes and $MS_{max} = 1152$ bytes. For example $MS_V$ may linearly increase from 256 bytes at 100 kbps (and below) to 1152 bytes at 460 kbps (and above).

Traffic shaping is implemented by the traffic shaper module 39 preferentially multiplexing audio data packets into the combined stream ahead of video data packets. That is, by delaying the multiplexing of any available video data packets, i.e. any video packets currently held in the video data buffer, into the combined stream to allow any audio data packets that are concurrently available, i.e. any audio data packets currently held in the audio data puffer, to be multiplexed into the combined stream first. That is, audio data packets are retrieved from the audio data buffer and incorporated into the combined stream in favor of video data packets in the video data buffer, such that video data packets are only incorporated into the combined stream when all available audio data packets have been incorporated.

Alternatively, a server, for example a media relay server, may receive the streams VS and/or AS, i.e. the server may take the place of the of the second user device 10 in FIG. 3. A media relay server also operates at the application layer 17, and in this case the channel 12 is a process-to-process, i.e. application layer, channel (or an end-to-end, i.e. transport layer, channel) between the transmitting user device 6 and the media relay server. The media relay server may perform functions such as re-packetization of the audio and/or video into new media data packets, for example after transcoding and/or audio mixing (e.g. in a group call) etc. The new media data packets are transmitted from the media relay server to the second user device 10 via a separate, additional process-to-process or end-to-end channel between the media relay server and the second user device 10. In this case, the media relay server may incorporate the present techniques into the re-packetization process, wherein the maximum packet size of the new video data packets is limited based on the playout rate and an end-to-end or process-to-process bandwidth estimation of the additional channel between the media relay server and the second user device 6.

That is, the present techniques can be implemented, for example:
1. at a transmitting user device, based on the end-to-end or process-to-process bandwidth of a channel between the transmitting user device and a receiving user device; or
2. at a transmitting user device, based on the end-to-end or process-to-process bandwidth of a channel between the transmitting user device and a server operating at the application layer 17 (or other intermediate device operating at the application layer 17); and/or
3. at a server (or other intermediate device), based on the end-to-end or process-to-process bandwidth of a channel between the server and a receiving user device.

Whilst the above has been described with reference to audio frames, the same techniques can be applied to video frames. For example, where the video frame rate exceeds the frame rate, video packet jitter may in fact be more perceptible than audio packet jitter, so it may be appropriate to adapt the maximum audio packet size $MS_A$ based on frame information 23 pertaining to the video frame rate $R_V$. Moreover, in general the data in the packets whose maximum size is adapted may not be audio or video data at all, but some other type of data, e.g. control data of a control data stream being multiplexed onto the same channel.

Note, generally, the frame information 23 can comprise the frame rate (R e.g. in frames per second) or the frame duration (FD=1/R e.g. in ms or audio samples where applicable) for example, which for an audio frame is a time interval over which the frame is played out and for a video frame is a time interval for which the frame is displayed before changing to the next video frame. The frame duration conveys the frame rate, as the frame rate is the inverse of the frame duration, i.e. R=1/FD.

Note, whilst in the above both the bandwidth BW and frame rate R are used to compute the maximum packet size MS, this is not essential e.g. in some cases a fixed bandwidth can be assumed. Moreover, the maximum packet size MS does not have to be determined at the client—it could be determined, say, elsewhere in the network or, in the case that a fixed bandwidth and a fixed frame rate can be assumed, even determined in advance and hard coded into the client 7.

Generally, any of the functions described herein can be implemented using software, firmware, hardware (e.g., fixed logic circuitry), or a combination of these implementations. The terms "module," "functionality," "component" and "logic" as used herein, such as those of FIG. 4, generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user devices 6, 10 (user terminals) may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

A first aspect of the subject matter is directed to a method of transmitting multiple data streams from a transmitting device via a channel to a receiving device, the method comprising: generating at the transmitting device a media data stream, which comprises audio or video data to be played out at the receiving device at a desired playout rate; determining a maximum packet size for another data stream using playout information, which pertains to the audio or video data of the media data stream and conveys the desired playout rate of the audio or video data; generating at the transmitting device, based on the determined maximum packet size, a plurality of data packets of the other data stream, each having a packet size no more than the determined maximum; and at the transmitting device, multiplexing the media data stream and the other data stream onto the channel, thereby transmitting both of the data streams from the transmitting device to the receiving device via the same channel.

In embodiments, the media data stream may be an audio data stream comprising audio data; wherein the other data stream may be a video data stream and the data packets may be video data packets comprising video data to be played out at the receiving device.

The maximum packet size may also be determined based on a bandwidth of the channel that is available for the media and other streams.

The maximum packet size may be no more than the available bandwidth divided by the desired playout rate.

The maximum packets size may be substantially equal to the available bandwidth divided by the desired playout rate.

The maximum packet size of the other stream may be no more than the available bandwidth divided by the desired playout rate less a maximum packet size of media data packets of the media stream.

The maximum packet size of the other stream may be substantially equal to the available bandwidth divided by the desired playout rate less the maximum packet size of the media data packets of the media stream.

The transmitting device may be a transmitting user device.

Alternatively, the transmitting device may be a transmitting server.

The receiving device may be a receiving user device.

Alternatively, the receiving device may be a receiving server. The bandwidth available for the media and other streams may be a total bandwidth of the channel, or a portion of the total bandwidth that is shared by the data streams.

Traffic shaping may be implemented at the transmitting device by delaying the multiplexing onto the channel of available data packets of the other data stream to allow available data packets of the media data stream to be multiplexed onto the channel first.

Data packets of the streams may be rendered available for multiplexing onto the channel by storing them in first and second data buffers of the transmitting device respectively.

The steps may be performed to effect a call between a user of the transmitting device and a user of the receiving device.

The maximum packet size may be lower limited by a first predetermined value and upper limited by a second predetermined value, and may vary as a function of at least the playout rate between the first and second predetermined values.

The streams may be multiplexed such that each adjacent pair of data packets of the media stream transmitted via the channel is separated by at most one data packet of the other stream on the channel.

The audio or video data may be in the form of a series of audio or video frames, the desired playout rate being a desired frame rate of the frames.

Each frame of the sequence of frames may be embodied in a single respective data packet of the media data stream.

The media data stream may be a video data stream comprising video data; and the other data stream may be an audio data stream and the data packets may be audio data packets comprising audio data to be played out at the receiving device.

The channel may be an application-layer channel established via a network at an application layer of the network.

The channel may be a transport-layer channel established via a network at a transport layer of the network.

A second aspect of the subject matter is directed to a device for transmitting multiple data streams to at least one other device, the device comprising: a network interface; a memory holding stream generation code; and a processor, wherein the stream generation code is configured when executed on the processor to cause operations of: generating a media data stream, which comprises audio or video data to be played out at the receiving device at a desired playout rate; determining a maximum packet size for another data stream using playout information, which pertains to the audio or video data of the media data stream and conveys the desired playout rate of the audio or video data; generating, based on the determined maximum packet size, a plurality of data packets of the other data stream, each having a packet size no more than the determined maximum; and multiplexing the media and other data streams onto the channel using the network interface, thereby transmitting both of the data streams from the transmitting device to the receiving device via the same channel.

A third aspect of the subject matter is directed to a method of transmitting audio and video data via a channel from a transmitting device to a receiving device, the method comprising: generating at the transmitting device a first set of data packets, which embody a first sequence of media frames to be played out at the receiving device at a desired frame rate, the first sequence of frames being one of audio or video frames; determining a maximum packet size for a second sequence of media frames using frame information pertaining to the first sequence of media frames of audio frames, which conveys the desired frame rate, wherein the second sequence of media frames are the other of audio or video frames; generating at the transmitting device, based on the determined maximum, a second set of data packets, which embody the second sequence of media frames, each of the second set of data packets having a packet size no more than the determined maximum; and at the transmitting device, multiplexing the first and second sets of data packets onto the channel, thereby transmitting both of the sets from the transmitting device to the receiving device via the same channel.

A fourth aspect of the subject matter is directed to a device for transmitting audio and video data to at least one other device, the device comprising: a network interface; a memory holding stream generation code; and a processor, wherein the stream generation code is configured when executed on the processor to implement the method of the third aspect.

A fifth aspect of the subject matter is directed to a computer program product comprising code stored on a computer readable medium and configured when executed to implement any of the methods of the above aspects or embodiments thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
generating at a transmitting device a first data stream that includes one or more of audio data or video data to be played out at a receiving device at a specified playout rate;
determining an available bandwidth of a channel that is available for the first data stream and a second data stream, the second data stream including different data than the first data stream;
determining a maximum packet size for the second data stream based on the determined available bandwidth and using playout information, which pertains to the first data stream and conveys the specified playout rate for the first data stream;
generating at the transmitting device, based on the determined maximum packet size, one or more data packets of the second data stream, each of the one or more data packets of the second data stream having a packet size no more than the determined maximum packet size; and
multiplexing the first data stream and the second data stream to enable the multiplexed first data stream and the second data stream to be transmitted over the channel.

2. A method according to claim 1, wherein the first data stream is an audio data stream comprising audio data; and
wherein the second data stream is a video data stream and the one or more data packets of the second data stream are video data packets comprising video data to be played out at the receiving device.

3. A method according to claim 1, wherein the receiving device is a user device.

4. A method according to claim 3, wherein the maximum packet size is no more than the available bandwidth divided by the specified playout rate.

5. A method according to claim 4, wherein the maximum packet size of the second data stream is no more than the available bandwidth divided by the specified playout rate less a maximum packet size of media data packets of the first media stream.

6. A method according to claim 5, wherein the maximum packet size of the second data stream corresponds to the available bandwidth divided by the specified playout rate less a maximum packet size of the media data packets of the first media stream.

7. A method according to claim 3, wherein the maximum packet size corresponds to the available bandwidth divided by the specified playout rate.

8. A method according to claim 1, wherein traffic shaping is implemented at the transmitting device by delaying the multiplexing onto the channel of data packets of the second data stream to allow data packets of the first media data stream to be multiplexed onto the channel first.

9. A method according to claim 8, wherein data packets of the first data stream and the second data stream are rendered available for multiplexing onto the channel by storing them in first and second data buffers of the transmitting device respectively.

10. A method according to claim 1, wherein the method is performed to effect a call between a user of the transmitting device and a user of the receiving device.

11. A method according to claim 1, wherein the maximum packet size is lower limited by a first predetermined value and upper limited by a second predetermined value, and varies as a function of at least the specified playout rate between the first and second predetermined values.

12. A method according to claim 1, wherein the first data stream and the second data stream are multiplexed such that each adjacent pair of data packets of the first media stream transmitted via the channel is separated by at most one data packet of the second stream on the channel.

13. A method according to claim 1, wherein the receiving device or the transmitting device is a server.

14. A system comprising:
one or more processors; and
one or more computer-readable storage devices storing instructions that are executable by the one or more processors to perform operations including:
generating at a transmitting device a first data stream that includes one or more of audio data or video data to be played out at a receiving device at a specified playout rate;
determining an available bandwidth of a channel that is available for the first data stream and a second data stream, the second data stream including different data than the first data stream;
determining a maximum packet size for the second data stream based on the determined available bandwidth and using playout information which pertains to the first data stream and conveys the specified playout rate for the first data stream;
generating at the transmitting device, based on the determined maximum packet size, one or more data packets of the second data stream, each of the one or more data packets of the second data stream having a packet size no more than the determined maximum packet size; and
multiplexing the first data stream and the second data stream to enable the multiplexed first data stream and the second data stream to be transmitted over the channel.

15. A system as described in claim 14, wherein the first data stream comprises audio data, and the second data stream comprises video data.

16. A system as described in claim 14, wherein the maximum packet size is no more than the available bandwidth divided by the specified playout rate.

17. A system as described in claim 14, wherein the maximum packet size corresponds to the available bandwidth divided by the specified playout rate.

18. A system as described in claim 14, wherein said multiplexing comprises delaying the multiplexing onto the channel of data packets of the second data stream to allow data packets of the first media data stream to be initially multiplexed onto the channel.

19. One or more computer-readable storage devices storing instructions that are executable to perform operations comprising:
generating at a transmitting device a first data stream that includes one or more of audio data or video data to be played out at a receiving device at a specified playout rate;
determining an available bandwidth of a channel that is available for the first data stream and a second data stream, the second data stream including different data than the first data stream;
determining a maximum packet size for the second data stream based on the determined available bandwidth and using playout information which pertains to the first data stream and conveys the specified playout rate for the first data stream;
generating at the transmitting device, based on the determined maximum packet size, one or more data packets of the second data stream, each of the one or more data packets of the second data stream having a packet size no more than the determined maximum packet size; and
multiplexing the first data stream and the second data stream to enable the multiplexed first data stream and the second data stream to be transmitted over the channel.

20. One or more computer-readable storage devices as described in claim 19, wherein the first data stream comprises audio data, and the second data stream comprises video data.

* * * * *